United States Patent Office 3,302,962
Patented Feb. 7, 1967

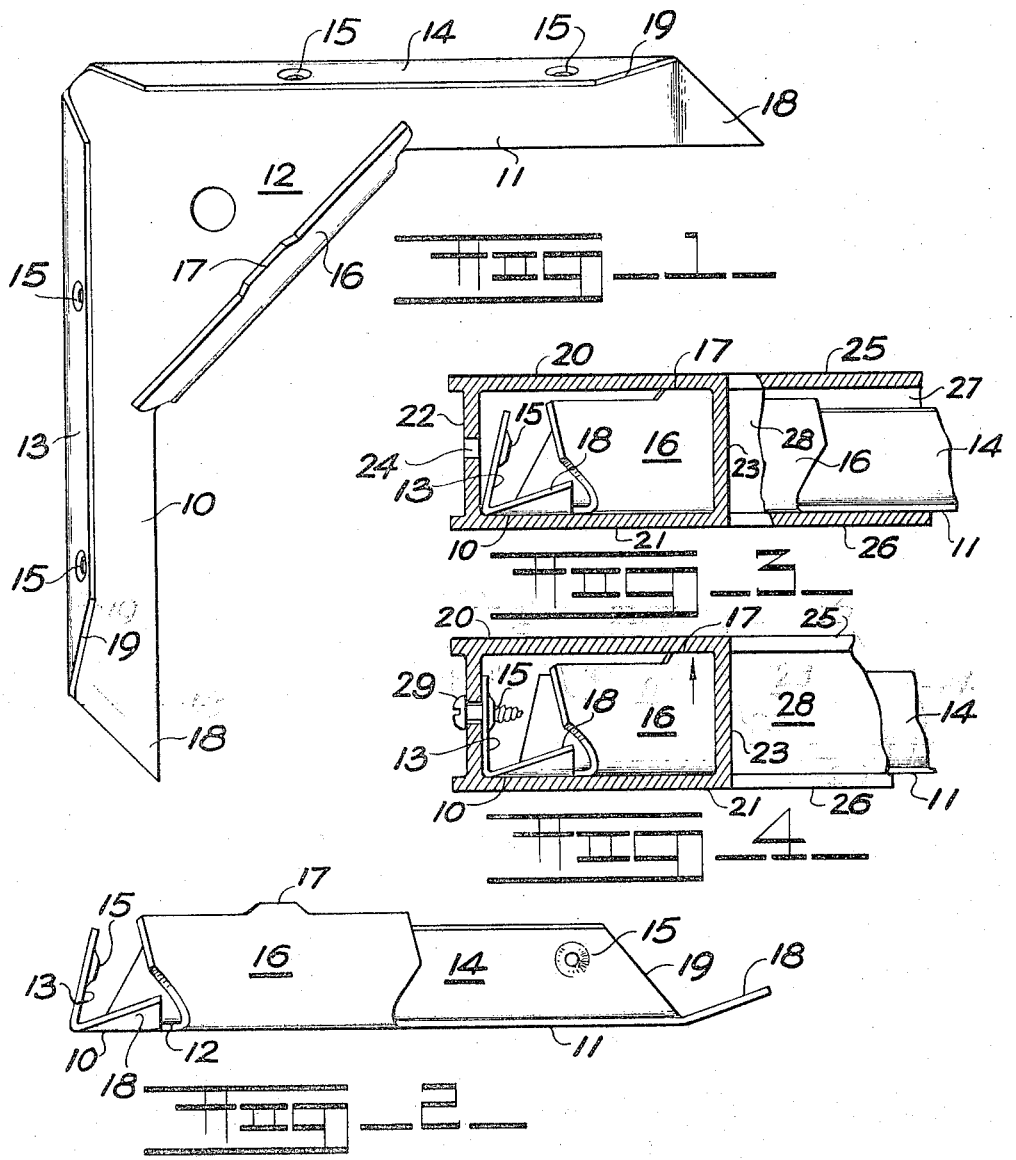

3,302,962
CORNER FASTENER FOR STORM DOORS AND THE LIKE
James H. Heywood, 1411 Doncaster,
Youngstown, Ohio 44511
Filed Feb. 16, 1965, Ser. No. 433,116
5 Claims. (Cl. 287—189.36)

This application is a continuation-in-part of application, Serial No. 338,455, filed January 17, 1964, on "Corner Fastener for Aluminum Extrusions."

This invention relates to corner fasteners for joining the corners of aluminum extrusions to one another as, for example, in forming storm doors or the like.

The principal object of the invention is the provision of a simple, inexpensive, one-piece corner fastener arranged to hold a pair of structural members in end-to-end relation, in desired alignment and under desirable tension.

A further object of the invention is the provision of a corner fastener for aluminum extrusions such as used in storm door frames and the like wherein mitered corners of aluminum extrusions are aligned and held in alignment under tension by said corner fastener and secondary fasteners, such as screws engaged through said extrusions therewith.

A still further object of the invention is the provision of a corner fastener which is simple in construction and capable of easy and economic manufacture and installation in forming mitered corners in aluminum storm doors and the like.

A still further object of the invention is the provision of a corner fastener which utilizes metal screws to alter the relative position and shape of a portion of the fastener so as to secure the same in the opposed ends of hollow aluminum extrusions and at the same time locate those extrusions in desired relation to one another and hold them in desired horizontal and vertical relation.

The corner fastener disclosed therein is particularly adapted for joining mitered ends of aluminum extrusions to one another as in forming a frame, such as a metal storm door. It has heretofore been common in the art to utilize L-shaped fasteners which were simply wedged into the ends of the hollow aluminum extrusions, and, in some instances, the metal of the extrusions was distorted as by peening into areas of the corner fasteners in an effort to secure the same in desired position. Still other L-shaped corner fasteners had integral flanges by which they were secured to the outer walls of the aluminum extrusions forming the frame as in a metal storm door by metal screws engaged therethrough.

The present invention comprises a substantial improvement in the art with respect to such devices and particularly with respect to the two-part corner fastener or gusset disclosed in my patent application, Serial No. 338,455.

In that patent application, a two-part metal fastener is disclosed which operates in an expanding action to wedge itself in the corner of a pair of extrusions which are brought into end engagement with one another, as, for example, at a mitered corner of a storm door, and since filing said application it has been determined that one of the parts of the two-part corner fastener of said application can be advantageously modified and becomes usable by itself as a highly efficient and practical and inexpensive corner fastener in the storm door art.

In the modification of the one part of the two-part fastener shown in said co-pending application, Serial No. 338,455, the improved device now incorporates a diagonally position spacing and locator guide which is formed on the particular corner fastener as disclosed herein in a position relative to the width of the hollow extrusion in which the device is to be positioned so that the diagonal spacing and locator guide insures the accurate end-to-end mitered alignment of the extrusions as is highly desirable in the art. Additionally, the corner fastener as disclosed herein is so formed that the same spacing and locator guide has an upstanding tab section which engages an inner wall of the hollow extrusion to locate and hold the corner fastener in a tensioned position therein particularly when metal screws are used to distort an elongated flange section on each right angular portion of the corner fastener.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a plan view of the corner fastener.

FIGURE 2 is an end elevation thereof.

FIGURE 3 is a vertical section through an extrusion adjacent a mitered corner therein and showing the corner fastener in first position in the corner thus formed.

FIGURE 4 is a view similar to FIGURE 3 showing a metal screw engaged in a distortable flange of the corner fastener so as to securely tension and lock the fastener in position in the mitered corner thus formed.

By referring to the drawings and FIGURES 1 and 2 in particular, it will be seen that the corner fastener comprises an L-shaped member having right angularly disposed arms 10 and 11 and an interconnecting diagonal web portion 12. The outermost longitudinal edges of the portions 10 and 11 are flanged as at 13 and 14, and these flanges are apertured and the metal about the apertures modified to form a metal screw receiving opening 15.

A secondary flange on the inner edge of the diagonal web portions 12 of the device comprises a spacing and locator guide 16, and it, in turn, is provided with an upstanding tab portion 17. It will be observed that the spacing and locator guide 16 is inclined slightly with respect to vertical or with respect to the plane of the portions 10 and 11 of the corner fastener. It will also be observed that the flanges 13 and 14 are inclined from vertical or with respect to the plane of the portions 10 and 11 of the corner fastener.

The outermost ends of the portions 10 and 11 of the corner fastener are pointed and upturned as seen in FIGURES 1 and 2 of the drawings, and generally indicated by the numeral 18. These upturned pointed ends 18 facilitate insertion of the corner fastener into the ends of the hollow extrusions to be joined thereby, and it will also be observed that the outermost ends of the flanges 13 and 14 are also diagonally formed as at 19 for the same purpose.

In FIGURES 1 and 2 of the drawings, the corner fastener is shown in the as formed state, and it will be observed that it can be easily and inexpensively formed of sheet metal, such as steel, aluminum or other desirable metal by a simple blanking and forming operation preferably formed on progressive dies. The location of the spacing and locator guide 16 relative to the apex or corner of the corner fastener is determined by the width of the interior of the hollow extrusion into which the device is to be positioned.

By referring now to FIGURE 3 of the drawings, it will be seen that there is a cross section showing of an aluminum extrusion having upper and lower walls 20 and 21, a recessed outer edge wall 22, and an inner wall 23. The illustration in FIGURE 3 shows the one-half portion of the corner fastener as seen in FIGURES 1 and 2 of the drawings and comprising the right angular portion 10, its flange 13 positioned in the hollow extrusion and moved toward the area of the cross section. In such position, it can be inserted until the diagonal spacing and locator guide 16 engages the opposite end of the inner wall 23, whereupon the corner fastener can be no longer moved into the hollow extrusion. The distortable flange 13 will lie in the position illustrated in FIGURE 3, and the apertured metal screw receiving openings 15 will align with the metal screw receiving openings 24 in the recessed wall 22 of the extrusion. Thus, the formation of the diagonally positioned spacing and locator guide 16 is determined by the width of the hollow extrusion into which the corner fastener is to be positioned as seen, for example, in FIGURES 3 and 4 of the drawings.

Still referring to FIGURE 3 of the drawings, it will be seen that the right angular portion 11 and its flange 14 are positioned within the end of a second hollow extrusion having a top wall 25, a bottom wall 26, an outer recessed wall 27, and an inner wall 28. The inner walls 23 and 28 are the same walls in a common extrusion which has been cut to form the mitered corner illustrated in FIGURE 3 of the drawings and in which the respective right angular portions 10 and 11 of the corner fastener have been inserted.

It will also be seen that the upwardly extending tabs 17 on the spacing and locator guide 16 engages the inner surface of the upper wall 20 of the extrusion, as well as the inner surface of the upper wall 25 of the joining extrusion, and bridges the diagonal mitered joint therebetween. The inner or upper surface of the bottom walls 21 and 26 are, of course, engaged by the lower surfaces of the right angular portions 10 and 11 of the corner fastener so that the same is thus frictionally positioned in the ends of the mitered extrusions in close engagement therewith.

By referring to FIGURE 4 of the drawings, it will be seen that a metal screw 29 has been positioned through the opening 24 and the recess wall 22 and engaged in the screw receiving formation 15 in the distortable flange 13 and that upon the metal screw 28 being tightened into position, the distortable flange 13 moves outwardly into abutting relation with the inner surface of the recess wall 22 of the one extrusion, while a similar action occurs with respect to the flange 14 when metal screws are positioned through the openings therein and engaged in exactly the same manner.

It will be observed that when this action occurs, the corner fastener is tensioned and since it cannot move vertically due to the prior engagement of the tab 17 against the uppermost surface and its general engagement against the bottom surfaces of the hollow extrusions, the tensioning occurs as the distortable flanges 13 and 14 are moved against the recess walls 22 and 27 by the metal screws.

It will be observed that this tension is exerted upwardly through the tab 17 and thus forces the inner corners of the mitered hollow extrusions into exact alignment which is highly desirable in forming a smooth, flat corner joint. It will thus be seen that the corner fastener disclosed herein may be simply and easily formed, quickly inserted and acts to positively secure mitered ends of hollow extrusions to one another under tension in accordance with the several objects of the invention, and having thus described my invention, what I claim is:

1. A corner fastener for securing hollow metal extrusions to one another in right angular relation comprising a flat L-shaped body member having longitudinally extending flanges on its outer edges, an intermediate portion of said flat body member forming a diagonal web between the right angular portions thereof, a secondary flange on said diagonal web portion, said first mentioned longitudianlly extending flanges being inclined with respect to the plane of said L-shaped body member and distortable to a right angular position relative thereto when installed in a corner construction.

2. The corner fastener disclosed in claim 1 and wherein said longitudinal flanges and said secondary flange on said diagonal portion of said corner fastener are arranged in oppositely disposed spaced relation with respect to one another and inclined toward one another.

3. The corner fastener set forth in claim 1 and wherein said secondary flange on said diagonal web portion of said corner fastener is spaced with respect to the outer corner of said corner fastener a distance equal to the forty-five degree diagonal width of the hollow extrusion in which said corner fastener is to be engaged.

4. The corner fastener set forth in claim 1 and wherein an upstanding extension is formed on said secondary flange inwardly of the ends thereof.

5. The corner fastener set forth in claim 1 and wherein the secondary flange on the diagonal edge of the diagonal web of the current fastener is of a height corresponding with the cross sectional inner height of the hollow extrusion in which the corner is to be inserted.

References Cited by the Examiner
UNITED STATES PATENTS
3,034,612  5/1962  Jourdan _____ 287—189.36
FOREIGN PATENTS
895,149  5/1962  Great Britain.

RICHARD W. COOKE, JR., *Primary Examiner.*